(12) United States Patent
Pertuit et al.

(10) Patent No.: US 8,619,044 B2
(45) Date of Patent: Dec. 31, 2013

(54) ELECTRONIC DEVICE INCLUDING TACTILE TOUCH-SENSITIVE DISPLAY AND METHOD OF CONTROLLING SAME

(75) Inventors: Michael Joseph Pertuit, Irving, TX (US); Scott Leonard Dill, Waterloo (CA)

(73) Assignee: BlackBerry Limited, Waterloo (CA)

( * ) Notice: Subject to any disclaimer, the term of this patent is extended or adjusted under 35 U.S.C. 154(b) by 636 days.

(21) Appl. No.: 12/570,217

(22) Filed: Sep. 30, 2009

(65) Prior Publication Data

US 2011/0074702 A1   Mar. 31, 2011

(51) Int. Cl.
*G06F 3/041* (2006.01)

(52) U.S. Cl.
USPC .......................................... 345/173; 345/174

(58) Field of Classification Search
USPC .................................. 345/173, 174
See application file for complete search history.

(56) References Cited

U.S. PATENT DOCUMENTS

| | | | |
|---|---|---|---|
| 6,509,892 B1 * | 1/2003 | Cooper et al. | 345/173 |
| 6,762,745 B1 * | 7/2004 | Braun et al. | 345/156 |
| 2003/0067449 A1 | 4/2003 | Yoshikawa et al. | |
| 2004/0227736 A1 * | 11/2004 | Kamrath et al. | 345/173 |
| 2006/0028095 A1 * | 2/2006 | Maruyama et al. | 310/316.01 |
| 2009/0072662 A1 * | 3/2009 | Sadler et al. | 310/319 |
| 2009/0133499 A1 | 5/2009 | Cato | |
| 2009/0167701 A1 | 7/2009 | Ronkainen | |

OTHER PUBLICATIONS

Simple Force Balance Accelerometer/Seismometer Based on a Tuning Fork Displacement Sensor , Sep. 14, 2004—D. Stuart-Watson and J. Tapson ; http://scitation.aip.org/getabs/servlet/GetabsServlet?prog=normal&id=RSINAK000075000009003045000001&idtype=cvips&gifs=yes.
Edge Sensors Forming a Touchscreen ; Divyasimha Harish http://www.faqs.org/patents/app/20080238884, Oct. 2, 2008.

* cited by examiner

*Primary Examiner* — Latanya Bibbins
(74) *Attorney, Agent, or Firm* — Steven M. Greenberg, Esq.; Carey, Rodriguez, Greenberg & O'Keefe

(57) ABSTRACT

A method of controlling an electronic device having a touch-sensitive display includes imparting, by an actuator, a force on the touch-sensitive display to provide tactile feedback, determining the force applied by the actuator on the touch-sensitive display, and adjusting a subsequent force imparted by the actuator based on the determined force.

13 Claims, 5 Drawing Sheets

ELECTRONIC DEVICE INCLUDING TACTILE TOUCH-SENSITIVE DISPLAY AND METHOD OF CONTROLLING SAME

FIELD OF TECHNOLOGY

The present disclosure relates to portable electronic devices that include a touch-sensitive display and the provision of tactile feedback for such devices.

BACKGROUND

Electronic devices, including portable electronic devices, have gained widespread use and may provide a variety of functions including, for example, telephonic, electronic text messaging and other personal information manager (PIM) application functions. Portable electronic devices can include several types of devices including mobile stations such as cellular phones, smart phones, Personal Digital Assistants (PDAs), and laptop computers. Touch-sensitive input devices are useful for input on a portable electronic device.

Devices such as PDAs or smart phones are generally intended for handheld use and ease of portability. Smaller devices are generally desirable for portability. Touch screen devices constructed of a display, such as a liquid crystal display (LCD), with a touch-sensitive overlay are useful on such handheld devices as such handheld devices are small and are therefore limited in space available for user input and output devices. Further, the screen content on the touch screen devices can be modified depending on the functions and operations being performed.

Improvements in provision and control of tactile feedback in touch-sensitive devices are desirable.

BRIEF DESCRIPTION OF THE DRAWINGS

Embodiments of the present disclosure will now be described, by way of example only, with reference to the attached Figures, in which.

DETAILED DESCRIPTION

Figure 1:
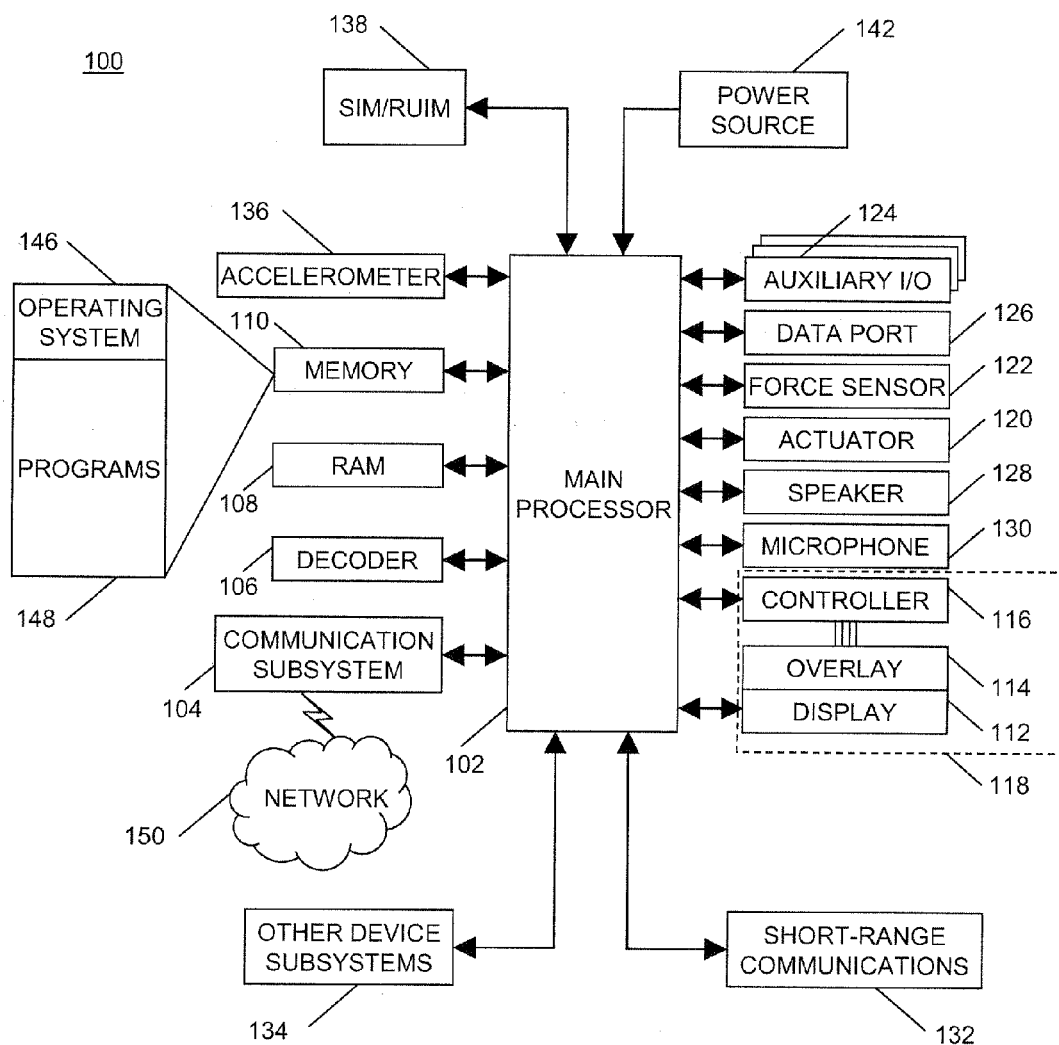
FIG. 1 is a block diagram of an example portable electronic device in accordance with the present disclosure.

A method of controlling an electronic device having a touch-sensitive display includes imparting, by an actuator, a force on the touch-sensitive display to provide tactile feedback, determining the force applied by the actuator on the touch-sensitive display, and adjusting a subsequent force imparted by the actuator based on the determined force.

For simplicity and clarity of illustration, reference numerals may be repeated among the figures to indicate corresponding or analogous elements. Numerous specific details are set forth to provide a thorough understanding of the embodiments described herein. The embodiments may be practiced without these specific details. In other instances, well-known methods, procedures, and components have not been described in detail so as not to obscure the embodiments described herein. The description is not to be considered as limited to the scope of the embodiments described herein.

The disclosure generally relates to an electronic device, which in the embodiments described herein is a portable electronic device. Examples of portable electronic devices include mobile, or handheld, wireless communication devices such as pagers, cellular phones, phones, personal organizers, PDAs, notebook computers, and the like. The portable electronic device may also be a portable electronic device without wireless communication capabilities.

The force applied by the actuator or actuators on the touch-sensitive display may be adjusted by adjusting the applied voltage or current to compensate for changes over time and with use of the portable electronic device. Factors such as battery voltage and temperature, that may change force applied by a piezo actuator to the touch-sensitive display, may be compensated for to provide desirable tactile feedback or confirming receipt of input to the user. This provides a positive response and reduces the chance of input errors such as double entry, decreasing use time and increasing user-satisfaction.

A block diagram of an example portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and dual-mode networks that support both voice and data communications. A power source 142, such as one or more rechargeable batteries or a port to another power supply, powers the portable electronic device 100.

The processor 102 interacts with other devices, such as a Random Access Memory (RAM) 108, memory 110, a display 112 with a touch-sensitive overlay 114 operably connected to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132 and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into the memory 110.

The portable electronic device 100 also includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, or surface acoustic wave (SAW) touch-sensitive display, as known in the art. A capacitive touch-sensitive display includes the display 112 and a capacitive touch-sensitive overlay 114. The overlay 114 may be an assembly of multiple layers in a stack including, for example, a substrate, LCD display 112, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118 and processed by the controller 116, for example, to determine a location of a touch. Touch location data may include a single point of contact, such as a point at or near a center of the area of contact, or the entire area of contact for further processing. The location of a touch detected on the touch-sensitive display 118 may include x and y components, e.g., horizontal and vertical with respect to one's view of the touch-sensitive display 118, respectively. For example, the x component may be determined by a signal generated from one touch sensor layer, and the y component may be determined by a signal generated from another touch sensor layer. A signal is provided to the controller 116 in response to detection of a suitable object, such as a finger, thumb, or other items, for example, a stylus, pen, or other pointer, depending on the nature of the touch-sensitive display 118. More than one simultaneous location of contact may occur and be detected.

Figure 2A:
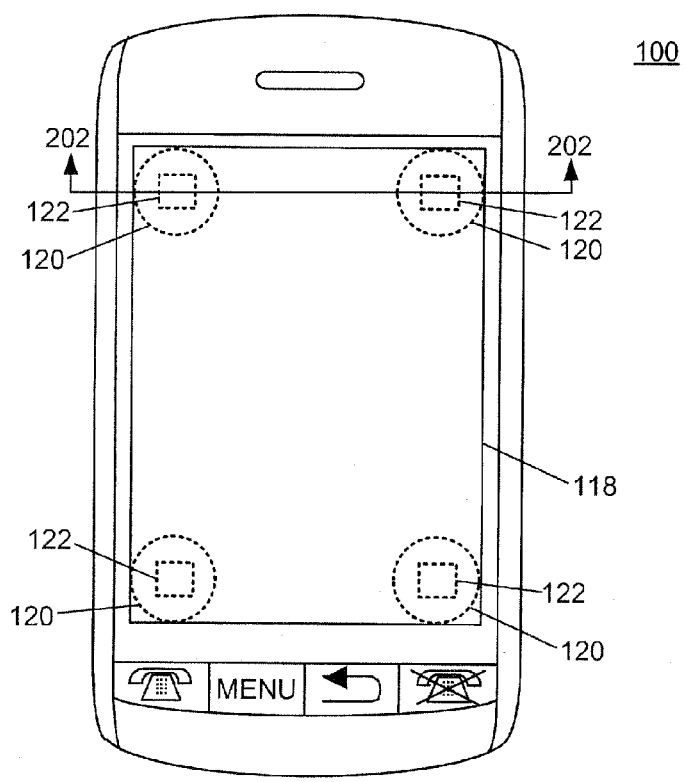
FIG. 2A is a front view of an example of a portable electronic device in accordance with the present disclosure.
Figure 2B:
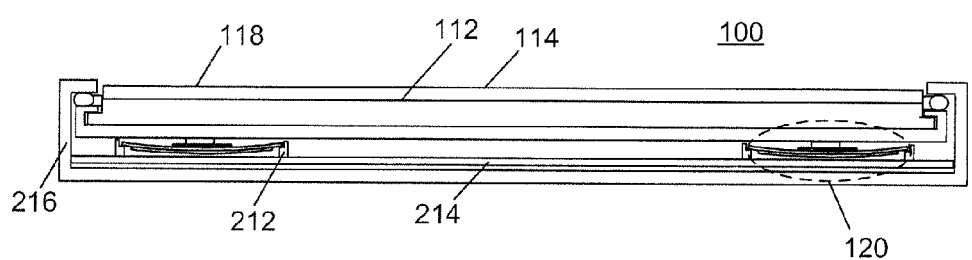
FIG. 2B is a sectional side view of the example portable electronic device of FIG. 2A through the line 202 of FIG. 2A, in accordance with the present disclosure.
Figure 2C:
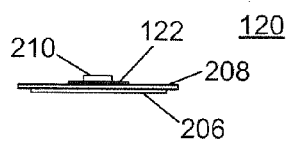
FIG. 2C is a side view of an actuator of the piezo actuator of FIG. 2B in accordance with the present disclosure.

The actuator 120 may comprise one or more piezoelectric (piezo) actuators that provide tactile feedback. FIG. 2A is a front view of an example of a portable electronic device 100. In the example shown in FIG. 2A, the actuator 120 comprises four piezo actuators 120, each located near a respective corner of the touch-sensitive display 118. FIG. 2B is a sectional side view of the portable electronic device 100 through the line 202 of FIG. 2A and FIG. 2C is a side view of a piezo actuator 120 of FIG. 2B.

Each piezo actuator 120 is supported on a respective support ring 212 that extends from a base 214 within a housing 216 of the portable electronic device 100. The base 214 may be any suitable base and may include, for example, a printed circuit board or flex circuit board supported by a stiff support between the base 214 and a back of the housing 216. The housing 216 may be any suitable housing for the internal components shown in FIG. 1 and for sealing with and facilitating movement of the touch-sensitive display 118 when an externally applied force is received on the touch-sensitive display 118 or when a force is applied by the piezo actuators 120 on the touch-sensitive display. In the present example, the accelerometer 136 is positioned on the base 214 and is arranged to detect displacement of the base 214 and is thereby utilized to determine the force on the base 214.

The support rings 212 extend from the base 214 such that contraction of the piezo actuators 120 results in an applied force against the touch-sensitive display 118, opposing a force externally applied to the touch-sensitive display 118. Each piezo actuator 120 includes a piezoelectric device, such as a piezoelectric (PZT) ceramic disk 206 adhered to a metal substrate 208. A shock-absorbing element 210 of, for example, hard rubber is located between the PZT disk 206 and the touch-sensitive display 118. In the present example, four force sensors 122 are utilized, with each force sensor 122 located between a respective shock absorbing element 210 and metal substrate 208. Depression of the touch-sensitive display 118 by user application of a force thereto is determined by a change in resistance at the force sensors 122.

The metal substrate 208 bends when the PZT disk 206 contracts diametrically due to build up of charge at the PZT disk 206 or in response to an external force applied to the touch-sensitive display 118. The charge may be adjusted by varying the applied voltage or current, thereby controlling the force applied by the piezo actuators 120 on the touch-sensitive display 118. The charge on the piezo actuators 120 may be removed by a controlled discharge current that causes the PZT disk 206 to expand diametrically, decreasing the force applied by the piezo actuators 120 on the touch-sensitive display 118. Absent an external force applied to the overlay 114 and absent a charge on the PZT disk 206, the piezo actuator 120 may be slightly bent due to a mechanical pre-load.

Figure 3:
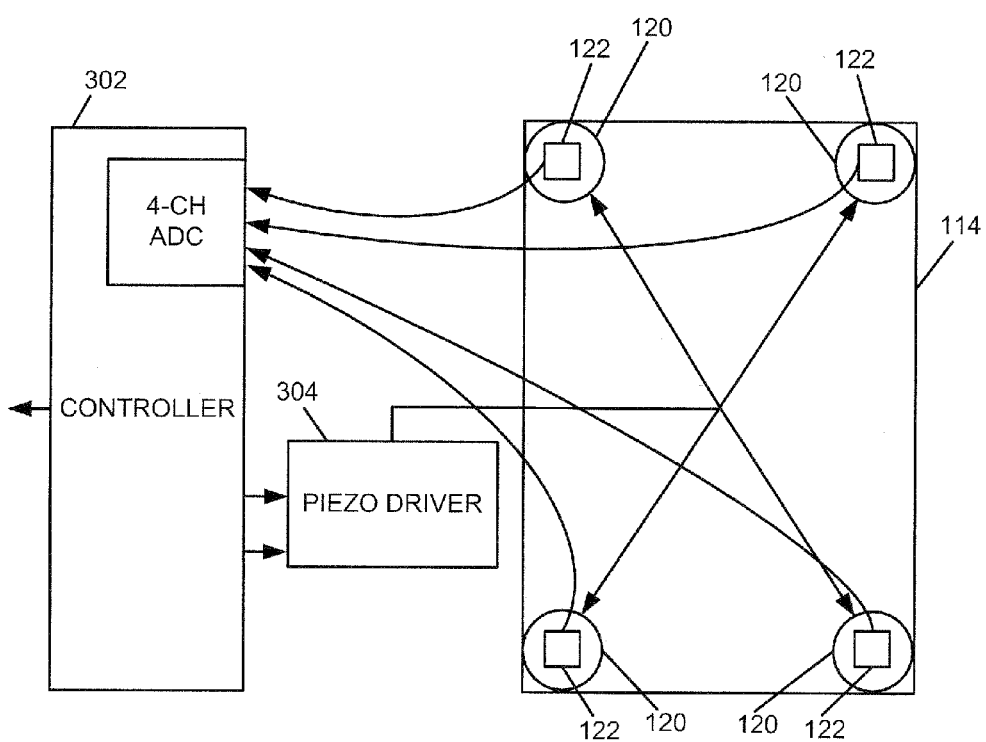
FIG. 3 is a functional block diagram showing components of the example portable electronic device in accordance with the present disclosure.

FIG. 3 shows a functional block diagram of components of the portable electronic device 100. In this example, each force sensor 122 is connected to a controller 302, which includes an amplifier and analog-to-digital converter (ADC). The force sensors 122 may be force sensing resistors in an electrical circuit and therefore the resistance changes with force applied to the force sensors 122. As applied force on the touch-sensitive display 118 increases, the resistance decreases. This change is determined via the controller 116 for each of the force sensors 122, and with calibrated force sensors 122, with known gain and offset values, the corresponding value of the force at each of the force sensors 122 is determined.

The piezo actuators 120 are connected to a piezo driver 304 that communicates with the controller 302. The controller 302 is also in communication with the main processor 102 of the portable electronic device 100 and may receive and provide signals to the main processor 102. The piezo driver 304 may optionally be embodied in drive circuitry between the controller 302 and the piezoelectric disks 312. The controller 302 controls the piezo driver 304 that controls the current to the PZT disks 206 and thus controls the charge and the force applied by the piezo actuators 120 on the touch-sensitive display 118. Each of the PZT disks 206 may be controlled substantially equally and concurrently. Optionally, the PZT disks 206 may be controlled separately. When an applied force, on the touch-sensitive display 118, exceeds a threshold, the charge at the piezo actuators 120 is modulated to impart a force on the touch-sensitive display to simulate collapse of a dome switch. When the applied force, on the touch-sensitive display 118 falls below a low threshold, after actuation of the piezo actuators 120, the charge at the piezo actuators 120 is modulated to impart a force, by the piezo actuators 120, to simulate release of a dome switch or similar haptics feedback mechanism.

The mechanical work performed by the piezo actuators 120 may be controlled to provide generally consistent force and movement of the touch-sensitive display 118 in response to detection of an applied force on the touch-sensitive display 118 in the form of a touch, for example. Fluctuations in mechanical work performed as a result of, for example, temperature, may be reduced by modulating the current to control the charge.

Figure 4:
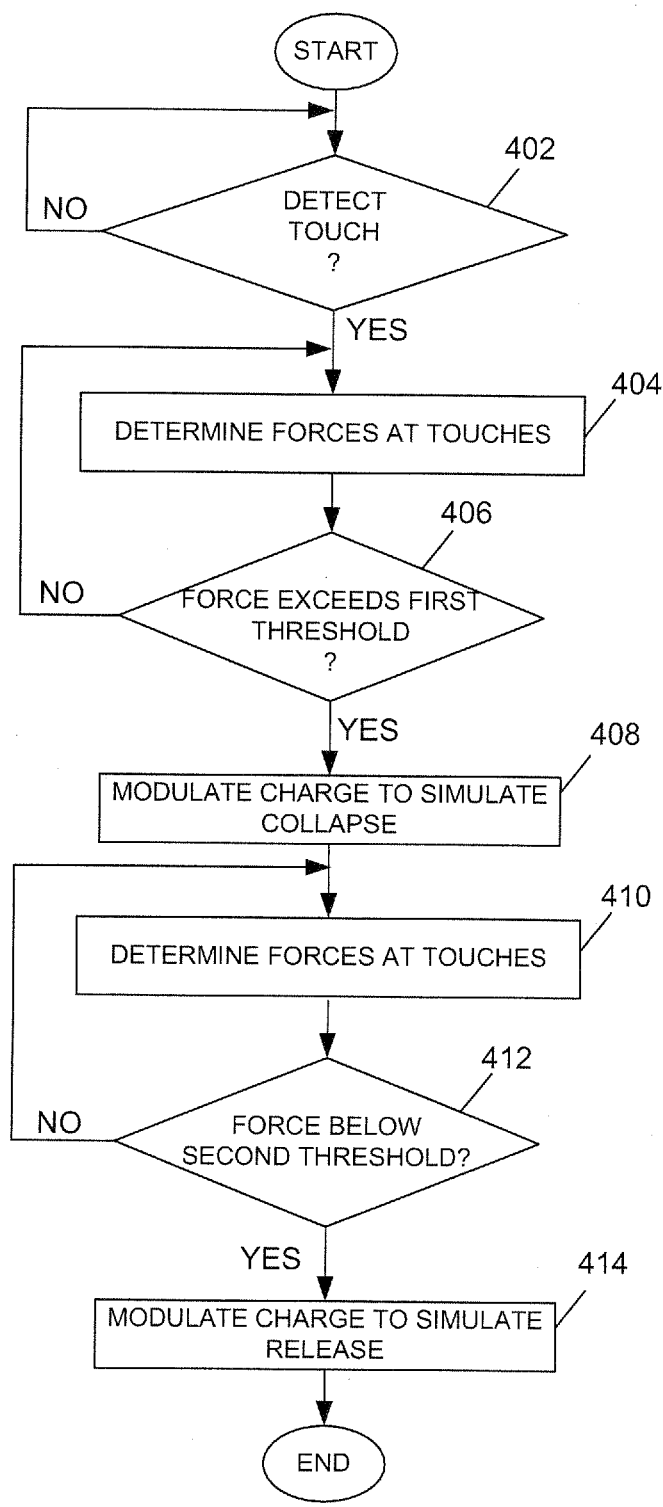
FIG. 4 is a flowchart illustrating a method of controlling a portable electronic device to provide tactile feedback in accordance with the present disclosure.

A flowchart illustrating a method of controlling an electronic device to provide tactile feedback is shown in FIG. 4. The method is advantageously performed by the processor 102 and the controller 302 performing stored instructions from a computer-readable medium. Coding of software for carrying out such a method is within the scope of a person of ordinary skill in the art given the present description.

When a touch is detected 402, the location of touch on the touch-sensitive display 118 is determined. The force of the touch is determined 404 based on signals from the force sensors 122. A determination is made 406 whether or not the force of the touch is above a first threshold and, if so, the charge at the piezo actuators 120 is modulated 408 to simulate collapse of a dome switch. When a determination is made 406 that the force of the touch is not above the first threshold, the process continues at 404 to determine the force of the touch. After modulating the charge at the piezo actuators 120 at 408, the force of the touch is determined 410 and a determination is made if the force has dropped below a second threshold that is lower than the first threshold. If a determination is made 410 that the force is below the second threshold, the charge at the piezo actuators 120 is modulated to simulate release 414 of the dome switch.

Figure 5:
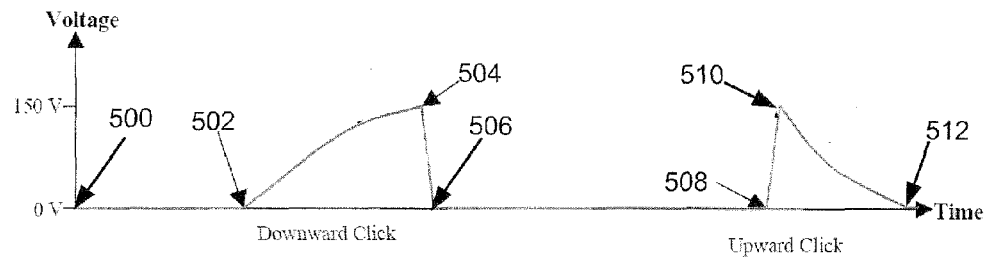
FIG. 5 is an example of a graph of voltage across a piezo actuator versus time during actuation in accordance with the present disclosure.

A simplified example of a graph of voltage across the PZT disks 206 versus time is shown in FIG. 5. The voltage shown is the voltage across one of the PZT disks 206, which is related to the charge. The touch is detected at the point 500. The externally applied force on the touch-sensitive display 118 exceeds the threshold at 502 and the charge at the PZT disk 206 is modulated between the points 502, 504 to ramp up the charge over a period of time that is sufficiently long to inhibit user detection of the force. The charge on the PZT disk 206 is removed over a much shorter period of time relative to the period of time for ramp up to simulate the collapse of the dome switch between the points 504, 506. When the externally applied force on the touch-sensitive display 118 falls below the low threshold, the charge at the PZT disk 206 is modulated to impart a force, by the piezo actuators 120, to increase the charge over a relatively short period of time to simulate release of a dome switch between the points 508, 510. The charge on the PZT disk 206 is removed to reduce the applied force by the piezo actuators 120 over a longer period of time between the points 510, 512.

The force applied by the piezo actuators 120 on the touch-sensitive display 118 may change over time and with use of the portable electronic device 100. Factors such as battery voltage and temperature may affect the force applied by the piezo actuators 120 on the touch-sensitive display 118, therefore changing the tactile feel. The force applied by the piezo actuators 120 may be adjusted during use of the device to compensate for changes by adjusting the applied voltage or current.

Figure 6:
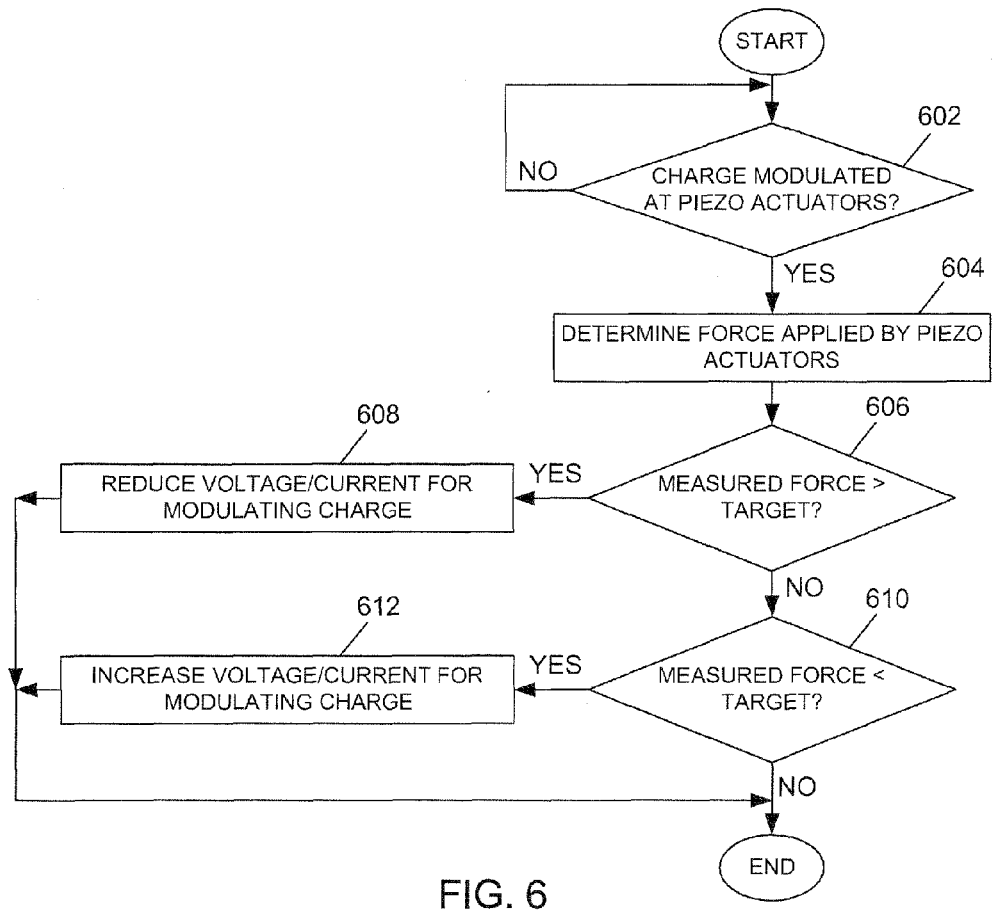
FIG. 6 is a flowchart illustrating a method of controlling an electronic device to adjust a force applied to a touch-sensitive display in accordance with the present disclosure.

FIG. 6 is a flow chart illustrating a method of controlling the portable electronic device 100 to adjust the force applied by the piezo actuators 120. The method of FIG. 6 may be carried out by, for example, by the processor 102 or the controller 302 or both the processor 102 and the controller 302 executing software from a computer-readable medium. Coding of software for carrying out such steps is well within the scope of a person of ordinary skill in the art given the present description.

As shown, when the charge at the piezo actuators 120 is modulated to simulate collapse or release of a dome switch at 602, the force applied by the piezo actuators 120 is determined. The force applied by the piezo actuators 120 is determined 604 based on the force measured utilizing the accelerometer 136 and the force determined utilizing the force sensors 122. The force measured utilizing the accelerometer 136 is a force at the base 214 of the portable electronic device 100 and is a result of forces transmitted to the base 214 through the piezo actuators 120. This force includes the force applied by the touch on the touch-sensitive display 118 and the force applied by the piezo actuators 120 on the touch-sensitive display 118. The force applied by the touch on the touch-sensitive display 118 is known from the force determined utilizing force sensors 122. The force applied by the piezo actuators 120 is determined by subtracting the force determined utilizing the force sensors 122 from the force determined utilizing the accelerometer 136. The force applied by the piezo actuators 120, that is determined at 604, is then compared to a target force. When a determination is made 606 that the force applied by the piezo actuators 120 is greater than the target force, the voltage or current for modulating the charge at the piezo actuators 120 is reduced 608 so that the force applied by the piezo actuators 120 for a subsequent touch is closer to the target force. When the force applied by the piezo actuators 120 is not greater than the target force, a determination is made 610 whether or not the force is less than the target force. When a determination is made 610 that the force applied by the piezo actuators 120 is less than the target force, the voltage or current for modulating the charge at the piezo actuators 120 is increased 612 so that the force applied by the piezo actuators 120 for a subsequent touch is closer to the target force.

The voltage or current may be reduced for the ramp up and discharge during simulation of collapse of the dome switch, for example, by reducing the peak charge at the piezo actuators 120 and the ramp-up slope without changing ramp up time or the discharge time. The voltage or current may also be reduced for the charge up and ramp down during simulation of release of the dome switch without changing the charge up time. The voltage or current may be increased, for the ramp up and discharge during simulation of collapse of the dome switch, for example, by increasing the peak charge at the piezo actuators 120 and the ramp-up slope, without changing ramp up time or the discharge time. The voltage or current may also be increased, for the charge up and ramp down during simulation of release of the dome switch, without changing the charge up time.

The target force may be pre-set during manufacture of the portable electronic device 100 or may be selectable to provide a desired tactile feedback. The applied voltage or current is adjusted based on the force applied by the piezo actuators 120 on the touch-sensitive display 118, facilitating the provision of generally consistent tactile feedback.

In the example described above with reference to FIG. 6, the forces applied by the piezo actuators 604 are determined during tactile feedback to simulate collapse and release of a dome switch when a touch is received on the touch-sensitive display 118. The forces applied by the piezo actuators 604 may also be determined, for example, during a vibration notification at the portable electronic device 100, when the piezo actuators 604 are also utilized to provide vibration. In this case, the force applied by the piezo actuators may be determined utilizing the accelerometer 136 and the force from a touch is not subtracted. The target force for vibration may be different than for simulation of collapse and release of a dome switch. Forces applied by the piezo actuators 120 for vibration may be adjusted in a similar manner using the different target force.

In the examples described herein, the accelerometer 136 is positioned on the base 214 and is arranged to detect displacement of the base 214 and determine the force on the base 214. Alternatively, any other suitable force sensor or force sensors may be utilized.

A method of controlling an electronic device having a touch-sensitive display includes imparting, by an actuator, a force on the touch-sensitive display to provide tactile feedback, determining the force applied by the actuator on the touch-sensitive display, and adjusting a subsequent force imparted by the actuator based on the determined force.

A computer-readable medium has computer-readable code embodied therein for execution by a processor in an electronic device to cause the electronic device to carry out the above method.

An electronic device includes a base, a touch-sensitive display moveable relative to the base, an actuator arranged to impart a force on the touch-sensitive display, an accelerometer and a processor operably coupled to the touch-sensitive display, the actuator and the accelerometer to determine, based on signals from the accelerometer, a force applied by the actuator on the touch-sensitive display and to adjust a subsequent force applied by the actuator based on the force determined at the processor.

Advantageously, the force applied by the piezo actuators 120 on the touch-sensitive display 118 may be adjusted by adjusting the applied voltage or current to compensate for changes over time and with use of the portable electronic device 100. Factors such as battery voltage and temperature, that may change the force applied to the touch-sensitive display, may be compensated for to provide desirable tactile feedback or confirming receipt of input to the user. This provides a positive response and reducing the chance of input errors such as double entry, decreasing use time and increasing user-satisfaction.

While the embodiments described herein are directed to particular implementations of the portable electronic device and the method of controlling the portable electronic device, it will be understood that modifications and variations may occur to those skilled in the art. All such modifications and variations are believed to be within the sphere and scope of the present disclosure.

What is claimed is:

1. A method of controlling an electronic device having a touch-sensitive display, the method comprising:
    imparting, by an actuator, a force on the touch-sensitive display to provide tactile feedback;
    determining, based on signals from an accelerometer and a force sensor, the force imparted by the actuator on the touch-sensitive display by subtracting a force determined utilizing the force sensor from a force determined utilizing the accelerometer;
    comparing the determined force to a target force; and
    adjusting a subsequent force imparted by the actuator based on the comparison.

2. The method according to claim 1, wherein determining the force imparted by the actuator comprises determining, utilizing the accelerometer, a force at a base of the electronic device that includes force imparted by the actuator and an external applied force.

3. The method according to claim 2, wherein determining the force imparted by the actuator comprises determining the external applied force from signals from the force sensor.

4. The method according to claim 3, wherein determining the force imparted by the actuator comprises subtracting the external applied force from the force determined at the base of the electronic device utilizing the accelerometer.

5. The method according to claim 1, wherein the actuator is a piezo actuator and imparting a force comprises modulating a charge at the actuator to cause the actuator to impart the force.

6. The method according to claim 5, wherein adjusting the subsequent force comprises one of adjusting an applied voltage or current to adjust the charge.

7. The method according to claim 6, wherein adjusting comprises decreasing an applied voltage or current when the force is greater than the target.

8. The method according to claim 6, wherein adjusting comprises increasing an applied voltage or current when the force is less than the target.

9. The method according to claim 5 wherein imparting the force comprises simulating collapse of a dome switch.

10. The method according to claim 5, wherein imparting the force comprises simulating release of a dome switch.

11. A non-transitory computer-readable medium having computer-readable code embodied therein for execution by a processor in an electronic device to cause the electronic device to carry out the method of claim 1.

12. An electronic device comprising:
    a base;
    a touch-sensitive display moveable relative to the base;
    an actuator arranged to impart a force on the touch-sensitive display;
    a force sensor;
    an accelerometer; and
    a processor operably coupled to the touch-sensitive display, the actuator and the accelerometer, the processor configured to
        determine, based on signals from the accelerometer and the force sensor, the force imparted by the actuator on the touch-sensitive display by subtracting a force determined utilizing the force sensor from a force determined utilizing the accelerometer;
        compare the determined force to a target force; and
        adjust a subsequent force imparted by the actuator based on the comparison.

13. The electronic device according to claim 12, wherein the accelerometer is arranged to measure a force at a base of the electronic device.

* * * * *